(12) United States Patent
Akiyama

(10) Patent No.: US 6,258,762 B1
(45) Date of Patent: *Jul. 10, 2001

(54) BEARING FOR HIGH EFFICIENCY ELECTRIC MOTOR

(75) Inventor: Motoharu Akiyama, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/511,689

(22) Filed: Feb. 23, 2000

(30) Foreign Application Priority Data

Sep. 8, 1999 (JP) .................................................. 11-292735

(51) Int. Cl.$^7$ ...................... C10M 105/48; C10M 169/02

(52) U.S. Cl. .......................... 508/462; 508/465; 508/496; 508/539

(58) Field of Search .............................................. 508/462

(56) References Cited

U.S. PATENT DOCUMENTS

| | | | |
|---|---|---|---|
| 2,739,127 | * 3/1956 | Morway et al. | 508/462 |
| 4,322,305 | * 3/1982 | Lewis | 508/462 |
| 5,009,803 | * 4/1991 | Brandolese | 508/462 |
| 5,223,161 | * 6/1993 | Waynick | 508/177 |
| 5,385,682 | * 1/1995 | Hutchings et al. | 508/178 |
| 5,387,374 | * 2/1995 | Westfechtel et al. | 508/462 |
| 5,595,965 | * 1/1997 | Wiggins | 508/491 |
| 5,668,092 | * 9/1997 | Denton | 508/146 |

FOREIGN PATENT DOCUMENTS 8-034987 6/1996 (JP) .

\* cited by examiner

Primary Examiner—Ellen M. McAvoy
(74) Attorney, Agent, or Firm—Oliff & Berridge, PLC

(57) ABSTRACT

A bearing for high efficiency electric motor with which low torque property, low noise property and low volatilization property can be maintained, is provided. The bearing for electric motor is sealed with a grease composition comprising:

(A) an alkali metal salts and/or an alkaline earth metal salt synthesized from a hydroxide of an alkali metal or an alkaline earth metal, and a higher fatty acid having 10 or more carbon atoms or a higher hydroxyfatty acid having at least one hydroxyl group and 10 or more carbon atoms;

(B) a carbonate compound represented by the general formula:

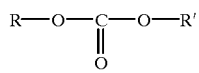

(R and R' represent a branched alkyl group having 13–15 carbon atoms, and may be same or different); and (C) at least one kind of an ester-based synthetic oil selected from the group consisting of a diester-based synthetic oil represented by the general formula (i):

$$ROCO(CH_2)_nCOOR' \qquad (i)$$

(R and R' represent an alkyl group having 3–18 carbon atoms, and may be the same or different, and n is 3–12);

a triester-based synthetic oil represented by the general formula (ii):

$$C_2H_5C(CH_2OCOR)_3 \qquad (ii)$$

(R represents an alkyl group having 3–10 carbon atoms);

a tetraester-based synthetic oil represented by the following general formula (iii):

$$C(CH_2OCOR)_4 \qquad (iii)$$

(R represents an alkyl group having 3–10 carbon atoms), and other neopentyl polyol ester-based synthetic oil.

10 Claims, 1 Drawing Sheet

BEARING FOR HIGH EFFICIENCY ELECTRIC MOTOR

BACKGROUND OF THE INVENTION

1. Field of the Invention

The present invention relates to a bearing for electric motor sealed with grease, and more particularly it relates to a bearing for electric motor sealed with grease, having small loss by friction, small noise and long life.

2. Description of the Related Art

Conventionally, various investigations have been made on bearing for electric motor to develop a bearing having small loss by friction, small noise and long life. Recently, in particular, global environmental problem is getting a great deal of attention, and advanced countries are obligated to make an effort to reduce waste of energy as less as possible. Various proposals have been made and improvement has been made on bearings used in every field, but it is the actual circumstances that further improvement is still required.

As one conclusion of energy saving problem, it is the demand of the times to use DC motors having good efficiency in place of AC motors.

In particular, in fan motors of air conditioners for household use, now it is the time to use DC motors having good efficiency in place of AC motors that still has the limit even after a converter is provided to change an output. Various proposals have been made to reduce energy loss and improvement has been made on bearings for electric motor used in every field, but it is the actual circumstances that further improvement is still required.

SUMMARY OF THE INVENTION

The present invention has been made for the purpose of providing a markedly excellent bearing for electric motor having low torque, low noise and long life, as compared with the conventional motor bearing.

As a result of various investigations to develop a bearing having the above-mentioned preferable characteristics, the present inventors have found that a good result is obtained by sealing a bearing for electric motor with a grease composition comprising an alkali metal salt and/or an alkaline earth metal salt of a higher fatty acid having 10 or more carbon atoms or of a higher hydroxyfatty acid having at least one hydroxyl group and 10 or more carbon atoms, a specific carbonate compound, and an ester-based synthetic oil such as a diester-based synthetic oil, triester-based synthetic oil or a tetraester-based synthetic oil, and have completed the present invention based on this finding.

Figure 1:
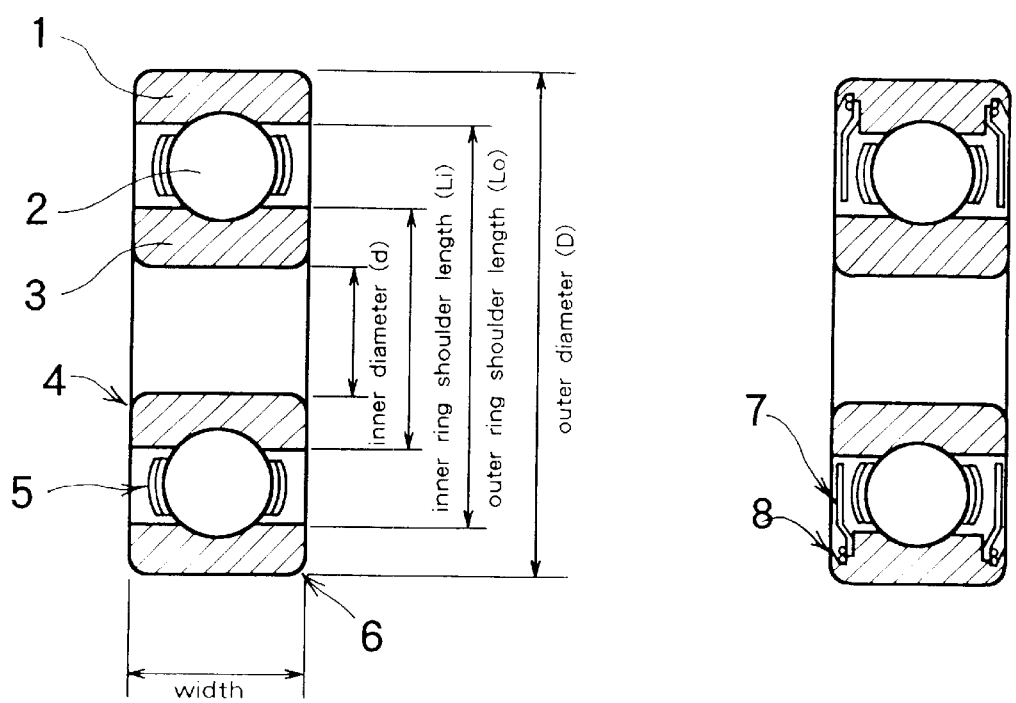
FIG. 1 shows a sectional view of a representative bearing of the present invention.

In the figure, each symbol means as follows: 1, an outer ring; 2, a ball; 3, an inner ring; 4, an inner ring chamfer; 5, a retainer; 6, an outer ring chamfer; 7, a shield; 8, a snap ring.

Similarly, d denotes an inner diameter; Li, an inner ring shoulder length; Lo, an outer ring shoulder length; D, outer diameter. A bearing space volume refers to a residual space volume, i.e., a space volume surrounded by the outer/inner rings and the shield, which is subtracted by the volume of the ball and the retainer.

DESCRIPTION OF THE PREFERRED EMBODIMENT

The grease of the present invention is that the combination itself of components is novel, and any proportion can be used as the grease.

The blending ratio of each component is desirably that the alkali metal salt and/or alkaline earth metal salt of the component (A) is 5–30 parts by mass and the mixed base oil composed of the carbonate compound of the component (B) and the ester-based synthetic oil of the component (C) is 70–95 parts by mass.

More preferably, the alkali metal salt and/or alkaline earth metal salt of the component (A) is 10–25 parts by mass and the mixed base oil composed of the carbonate compound of the component (B) and the ester-based synthetic oil of the component (C) is 75–90 parts by mass.

If the alkali metal salt and/or alkaline earth metal salt of the component (A) is less than 5 parts by mass, the mixture consistency becomes soft and there is the possibility of leakage or scatter at the rotation of bearing, which requires attention. On the other hand, if it exceeds 30 parts by mass, the grease becomes too hard. As a result, fluidity of the grease inside the bearing lowers and there is the possibility to cause poor lubrication, which requires attention.

Next, the ratio of the carbonate compound (B) used as the base oil in the grease composition of the present invention and the ester-based synthetic oil is preferable that $(B)/[(B)+(C)]$ is 0.1 or more and less than 0.95 by mass ratio.

More preferably, $(B)/[(B)+(C)]$ is 0.2 or more and 0.8 or less. If $(B)/[(B)+(C)]$ is less than 0.1, there is no effect of torque decrease, and if it is 0.95 or more, the volatility becomes too high.

Further, the grease composition of the present invention can contain various additives generally used in greases.

Examples of the additives are additives generally used in grease compositions, for example, oxidation inhibitors such as phenyl α(β)naphthylamine, alkyl diphenylamine, phenothiazine or t-butylphenol, and rust preventives such as metal sulfonate, nonionic types or amine types.

Representative examples of the alkali metal salt and/or alkaline earth metal salt which is the component (A) used in the present invention include lithium stearate and lithium 12 hydroxystearate.

The representative example of the carbonate compound that is the component (B) of the grease composition used in the present invention is a compound represented by the following formula:

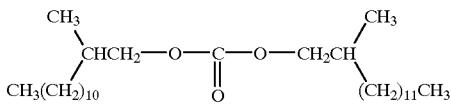

Further, the tetraester-based synthetic oil that is the component (C) of the grease composition used in the present invention includes di-2-ethylhexyl sebacate, di-2-ethylhexyl azerate, di-2-ethylhexyl adipate, trimethylol propane ester, pentaerythritol ester and dipentaerythritol ester.

The grease composition used in the present invention is desirably 25vol %–55 vol % of a space volume of the bearing. If smaller than this, torque lowers, but life as a bearing is short. If larger than this, torque becomes large or grease leakage may occur.

The most popular application of the present bearing for high efficiency electric motor is particularly fan motors of air-conditioners for household use. The current air-conditioners are driven using AC motors. However, replacement of AC motors with DC motors is demanded, because DC motors are more preferable in that, from the standpoint of the air quantity which is proportional to the cube of the rotating speed, they need no inverter, their rotating speed can be easily controlled, and further they are more energy-saving.

Preferred embodiment of the present invention is described below.

(1) A bearing for electric motor sealed with a grease composition, wherein the grease composition comprises:
(A) an alkali metal salt and/or an alkaline earth metal salt synthesized from a hydroxide of an alkali metal or an alkaline earth metal, and a higher fatty acid having 10 or more carbon atoms or a higher hydroxyfatty acid having at least one hydroxyl group and 10 or more carbon atoms;
(B) a carbonate compound represented by the general formula:

(R and R' represent a branched alkyl group having 13–15 carbon atoms, and may be same or different); and
(C) at least one kind of an ester-based synthetic oil selected from the group consisting of a diester-based synthetic oil represented by the general formula (i):

ROCO(CH$_2$)$_n$COOR'  (i)

(R and R' represent an alkyl group having 3–18 carbon atoms, and may be the same or different, and n is 3–12); a triester-based synthetic oil represented by the general formula (ii):

C$_2$H$_5$C(CH$_2$OCOR)$_3$  (ii)

(R represents an alkyl group having 3–10 carbon atoms); and a tetraester-based synthetic oil represented by the following general formula (iii):

C(CH$_2$OCOR)$_4$  (iii)

(R represents an alkyl group having 3–10 carbon atoms); and other neopentyl polyol ester-based synthetic oil.

(2) A bearing for electric motor sealed with the grease composition described in (1) above, wherein the component (A) is 5–30 parts by weight, and a mixed base oil comprising the component (B) and
(C) is 70–95 parts by weight.
(3) A bearing for electric motor sealed with the grease composition described in (1) or (2) above, using as a base oil a polyol ester wherein a mixing ratio of the carbonate compound of the component
(B) and the ester-based synthetic oil of the component (C) is such that (B)/[(B)+(C)] is 0.1 or more and less than 0.95 by mass ratio.
(4) A bearing for electric motor sealed with the grease composition described in (1) to (3), using the carbonate compound wherein R and R' are a branched alkyl group represented by the general formula:

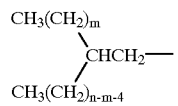

and may be the same or different (n is an integer of 13–15 and m is an integer of 0–6).

(5) A bearing for electric motor sealed with the grease composition described in any one of (1) to (4) above, wherein the component
(C) is the diester-based synthetic oil represented by the general formula (i):

ROCO(CH$_2$)$_n$COOR'  (i)

(R and R' represent an alkyl group having 3–18 carbon atoms, and may be the same or different, and n is 3–12).

(6) A bearing for electric motor sealed with the grease composition described in any one of (1) to (5) above, wherein the component
C) is the tetraester-based synthetic oil represented by the general formula (iii):

C(CH$_2$OCOR)$_4$  (iii)

(R represents an alkyl group having 3–10 carbon atoms).

(7) A bearing for electric motor described in any one of (1) to
(6) above, wherein the bearing is used for a fan motor of an air-conditioner for household use.

(8) A bearing for electric motor described in any one of (1) to
(7) above, wherein the motor is an AC motor.

(9) A bearing for electric motor described in any one of (1) to
(7) above, wherein the motor is a DC motor.

The present invention is described in more detail based on the Examples, but the present invention has no limitation by the following Examples.

EXAMPLES

The evaluation of the sample in each Example was carried out according to the method below.

In Examples 1–6, lithium stearate or lithium 12 hydroxystearate was used as the alkali metal salt, a carbonate containing an organic carbonate containing a branched alkyl having 13–15 carbon atoms represented by the following formula:

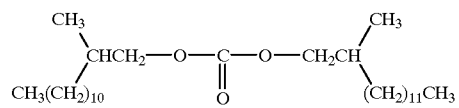

is used as the carbonate, and a tetraester oil and/or a diester oil were used as the ester-based synthetic oil. DOS(di-2-ethylhexyl sebacate) was used as the diester oil, and PE(pentaerythritol ester) was used as the tetraester oil. Components were mixed in the proportion as shown in Table 1 such that the sum of lithium stearate and lithium 12 hydroxystearate was 100 mass %, and while mixing until the whole became liquid, the mixture was heated to 220–230° C. The mixture was poured in a stainless steel vessel at a thickness of 3–5 mm, cooled to 50° C. or lower and homogenized with three rolls, thereby obtaining a grease composition. The component proportion and test results of the grease composition are shown in Table 1.

TABLE 1

| Grease production example | 1 | 2 | 3 | 4 | 5 | 6 |
|---|---|---|---|---|---|---|
| Thickening agent StLi |  |  |  | 20 |  | 2 | 20 |
| 12OH St-Li | 16 | 12 |  | 12 | 10 |  |
| Base oil Carbonate | 33.6 | 35.2 | 32 | 52.8 | 35.2 | 20 |
| Tetraester oil | 50.4 | 52.8 | 48 |  | 52.8 | 50 |
| Diester oil |  |  |  | 35.2 |  | 10 |
| Base oil viscosity (40° C.) | 26 | 26 | 26 | 15 | 26 | 26 |
| Mixture consistency (25° C.) | 185 | 230 | 202 | 221 | 245 | 210 |
| Dropping point ° C. | 201 | 193 | 197 | 198 | 196 | 197 |

(Comparative Example)

Further, for comparison, two kinds of commercially available greases in which a base oil and a thickening agent were known were used as Comparative Examples 1 and 2, and the results are shown in Table 2. In Table 2, the mark+shows the component blended. Further, a base oil not containing the component (C) and lithium soap were blended in the proportion shown in Table 2, and a grease composition was obtained in the same manner as in the grease production examples. This was shown as Comparative Example 3.

The characteristics such as mixture consistency and dropping point for the grease compositions of the grease production examples and the comparative grease production examples are shown in Table 2.

TABLE 2

| Comparative grease production example | 1 | 2 | 3 |
|---|---|---|---|
| Thickening agent StLi | + | + | 15 |
| 12OH St-Li | + | + | 5 |
| Base oil Carbonate |  |  | 80 |
| Tetraester oil | + |  |  |
| Diester oil | + |  |  |
| Mineral oil |  | + |  |
| Base oil viscosity (40° C.) | 26 | 100 | 18 |
| Mixture consistency (25° C.) | 250 | 280 | 181 |
| Dropping point ° C. | 194 | 190 | 195 |

The representative compositions out of the grease compositions were sealed in a bearing for motor in 30 vol % of the bearing space volume, and a test of 1,000 hours was repeated. The results obtained are shown in Table 3.

Example 1 used the grease of Production Example 1 in Table 1.

Example 2 used the grease of Production Example 2 in Table 1.

Example 3 used the grease of Production Example 3 in Table 1.

Comparative Example 1 used the commercially available grease 1 in Table 2.

Comparative Example 2 used the comparative grease 3 in Table 2.

TABLE 3

| Grease | Torque gf Cm | Anderon M | Anderon H | Volatili- zation | Total evaluation |
|---|---|---|---|---|---|
| Example 1 | ○ | ○ | ○ | ○ | Excellent |
| Example 2 | ○ | ○ | ○ | ○ | Excellent |
| Example 3 | ○ | ○ | ○ | ○ | Excellent |

TABLE 3-continued

| Grease | Torque gf Cm | Anderon M | Anderon H | Volatili- zation | Total evaluation |
|---|---|---|---|---|---|
| Comparative example 1 | X | ○ | ○ | Δ | Not available |
| Comparative example 2 | X | X | X | X | Not available |

For measurement of the characteristics values, the mixture consistency was determined according to JIS K2220 5.3, and the dropping point was determined according to JIS K2220 5.4.

The bearing characteristic tests were conducted such that a grease composition which is a sample to be measured was sealed in a bearing for electric motor, and rotating torque, acoustic properties at ordinary temperature, volatilization amount after 1,000 hours in a bearing rotation test at an ambient temperature of 100° C. at a rotating speed of 3,000 rpm, and acoustic properties (acoustic life) of the bearing were measured.

The acoustic properties was measured as Anderon value with an Anderon meter before and after the bearing rotation test. Anderon M can measure the sound of 300–1,800 cycles, which is an annoying sound for human. Anderon H can measure the sound of 1,800–10,000 cycles.

The rotating torque was measured with a torque tester at 3,000 rpm with 2 kg load at room temperature.

The volatilization amount was determined from the difference in weight of the bearing measured before and after the bearing rotation test. The smaller Anderon value, the lower torque, and the smaller volatilization amount respectively mean the better acoustic properties.

The evaluation as a bearing for electric motor was made according to the standard shown in Table 4.

TABLE 4

| Evaluation | Torque gf Cm | Anderon M | Anderon H | volatilization |
|---|---|---|---|---|
| ○ | <15 | <1.2 | <0.5 | <10 |
| Δ | 16–25 | 1.3–2.5 | 0.6–1.0 | 11–20 |
| X | >26 | >2.6 | >1.1 | >21 |

As is apparent from Table 3, it was confirmed that the bearing sealed with the grease composition of the present invention is exhibits low torque property, low noise property and low volatilization property, as compared with the bearing for electric motor sealed with the conventional grease composition.

What is claimed is:

1. A bearing for electric motor sealed with a grease composition, wherein the grease composition comprises:

(A) a thickener comprising an alkali metal salt and/or an alkaline earth metal salt synthesized from a hydroxide of an alkali metal or an alkaline earth metal, and a higher fatty acid having 10 or more carbon atoms or a higher hydroxyfatty acid having at least one hydroxyl group and 10 or more carbon atoms; and a base oil comprising a mixture of a carbonate compound (B) and an ester-based synthetic oil (C);

wherein the carbonate compound (B) is represented by the following general formula

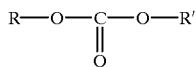

wherein R and R' represent a branched alkyl group having 13–15 carbon atoms, and may be the same or different; and ROCO(CH$_2$)$_n$COOR' wherein R and R' represent an alkyl group having 3–18 carbon atoms, and may be the same or different, and n is 3–12;

a triester-based synthetic oil represented by the following general formula

C$_2$H$_5$C(CH$_2$OCOR)$_3$ wherein R represents an alkyl group having 3–10 carbon atoms; and a tetraester-based synthetic oil represented by the following general formula

C(CH$_2$OCOR)$_4$ wherein R represents an alkyl group having 3–10 carbon atoms; and other neopentyl polyol ester-based synthetic oil.

2. A bearing for electric motor sealed with the grease composition as claimed in claim 1, wherein the thicker is 5–30 parts by weight and the base oil is 70–95 parts by weight.

3. A bearing for electric motor sealed with the grease composition as claimed in claim 1, wherein said R and R' of the carbonate compound represented by the general formula are a branched alkyl group represented by the following general formula

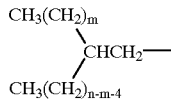

wherein n is an integer of 13–15 and m is an integer of 0–6, and may be the same or different.

4. A bearing for electric motor sealed with the grease composition as claimed in claim 1, wherein the ester-based synthetic oil is the diester-based synthetic oil represented by the following general formula ROCO(CH$_2$)$_n$COOR' wherein R and R' represent an alkyl group having 3–18 carbon atoms, and may be the same or different, and n is 3–12.

5. A bearing for electric motor sealed with the grease composition as claimed in claim 1, wherein the ester-based synthetic oil is the tetraester-based synthetic oil represented by the following general formula

C(CH$_2$OCOR)$_4$ wherein R represents an alkyl group having 3–10 carbon atoms.

6. A bearing for electric motor sealed with the grease composition claimed claim 1, wherein the bearing is used for a fan motor of an air-conditioner for household.

7. A bearing for electric motor sealed with the grease composition as claimed in claim 1, wherein the bearing is used for an AC motor.

8. A bearing for electric motor sealed with the grease composition as claimed in claim 1, wherein the bearing is used for a DC motor.

9. A bearing for electric motor sealed with the grease composition as claimed in claim 1, wherein the grease composition is fills 25–55 volume % of the space volume of the bearing.

10. A bearing for electric motor sealed with the grease composition as claimed in claim 1, wherein a ratio of (B)/((B)+(C)) of said mixture is in a range of 0.1 to 0.95 by mass.

* * * * *